United States Patent
Chauhan et al.

(10) Patent No.: US 11,268,034 B2
(45) Date of Patent: Mar. 8, 2022

(54) LIGNIN TO LIQUID FUELS AND POLYOLS USING BIOMASS-DERIVED SOLVENTS

(71) Applicant: Battelle Memorial Institute, Columbus, OH (US)

(72) Inventors: Satya P. Chauhan, Columbus, OH (US); Daniel B. Garbark, Blacklick, OH (US)

(73) Assignee: Battelle Memorial Institute, Columbus, OH (US)

( * ) Notice: Subject to any disclaimer, the term of this patent is extended or adjusted under 35 U.S.C. 154(b) by 14 days.

(21) Appl. No.: 16/631,116

(22) PCT Filed: Jul. 13, 2018

(86) PCT No.: PCT/US2018/042103
§ 371 (c)(1),
(2) Date: Jan. 14, 2020

(87) PCT Pub. No.: WO2019/014602
PCT Pub. Date: Jan. 17, 2019

(65) Prior Publication Data
US 2020/0231879 A1    Jul. 23, 2020

Related U.S. Application Data

(60) Provisional application No. 62/642,709, filed on Mar. 14, 2018, provisional application No. 62/532,801, filed on Jul. 14, 2017.

(51) Int. Cl.
C10G 1/06 (2006.01)
C10G 1/04 (2006.01)
(Continued)

(52) U.S. Cl.
CPC ............. *C10G 1/065* (2013.01); *C10G 1/002* (2013.01); *C10G 1/02* (2013.01); *C10G 1/042* (2013.01);
(Continued)

(58) Field of Classification Search
CPC ........ C10G 1/002; C10G 1/042; C10G 1/045; C10G 1/065
See application file for complete search history.

(56) References Cited

U.S. PATENT DOCUMENTS

| 4,303,496 A | 12/1981 | Rudnick |
|---|---|---|
| 4,409,089 A | 10/1983 | Rudnick |

(Continued)

FOREIGN PATENT DOCUMENTS

| CN | 102344823 A | 2/2012 |
|---|---|---|
| WO | 201111705 A2 | 9/2011 |

(Continued)

OTHER PUBLICATIONS

Written Opinion from PCT Application No. PCT/US2018/042103, dated Dec. 17, 2018.

(Continued)

*Primary Examiner* — Renee Robinson
(74) *Attorney, Agent, or Firm* — Greer, Burns & Crain, Ltd.

(57) ABSTRACT

A process of producing a distillate fuel from lignin includes: preparing a biomass-derived lignin solvent; dissolving the lignin in the biomass-derived solvent; and separating undissolved lignin and mineral matter to produce a syncrude. In certain embodiments, the process further includes subjecting the syncrude to a hydrotreatment/hydrogenation process to produce a distillate fuel. A process to improve direct lignin liquefaction includes: using a non-hydrogenated lipid in a direct lignin liquefaction process to facilitate lignin depo- (Continued)

lymerization. A process for using a biomass-derived feedstock as a hydrogen donor includes: providing a biomass-derived feedstock; modifying the feedstock to improve its usefulness as a hydrogen donor; and conducting a transfer hydrogenation process using the modified feedstock as a hydrogen donor.

21 Claims, 6 Drawing Sheets

(51) Int. Cl.
*C10G 1/02* (2006.01)
*C10G 69/06* (2006.01)
*C10G 45/32* (2006.01)
*C10G 45/44* (2006.01)
*C10G 1/00* (2006.01)

(52) U.S. Cl.
CPC .............. *C10G 1/045* (2013.01); *C10G 45/32* (2013.01); *C10G 45/44* (2013.01); *C10G 69/06* (2013.01); *C10G 2300/107* (2013.01); *C10G 2300/1011* (2013.01); *C10G 2300/42* (2013.01); *C10G 2300/44* (2013.01); *Y02P 30/20* (2015.11)

(56) References Cited

U.S. PATENT DOCUMENTS

| | | | |
|---|---|---|---|
| 5,792,340 A | 8/1998 | Freel et al. | |
| 5,961,786 A | 10/1999 | Freel et al. | |
| 7,691,159 B2 | 4/2010 | Li | |
| 7,905,990 B2 | 3/2011 | Freel | |
| 7,960,520 B2 * | 6/2011 | McCall | C10G 1/083 530/503 |
| 8,499,702 B2 | 8/2013 | Palmas et al. | |
| 8,519,206 B2 | 8/2013 | Holtzapple et al. | |
| 8,961,743 B2 | 2/2015 | Freel | |
| 2007/0100162 A1 * | 5/2007 | Petrus | C08L 97/02 562/515 |
| 2008/0047876 A1 | 2/2008 | Keller | |
| 2008/0139418 A1 | 6/2008 | Cioletti et al. | |
| 2009/0250381 A1 | 10/2009 | Fan et al. | |
| 2010/0159522 A1 | 6/2010 | Cirakovic | |
| 2011/0230688 A1 | 9/2011 | Charon et al. | |
| 2012/0005949 A1 * | 1/2012 | Stevens | C10G 1/002 44/307 |
| 2012/0091042 A1 | 4/2012 | Stiller et al. | |
| 2012/0304529 A1 | 12/2012 | O'Connor et al. | |
| 2013/0247449 A1 * | 9/2013 | Castelly Barnes | C10G 1/04 44/307 |
| 2013/0338411 A1 | 12/2013 | Sharma | |
| 2016/0032196 A1 | 2/2016 | Abdullah et al. | |
| 2016/0130202 A1 | 5/2016 | Barta et al. | |

FOREIGN PATENT DOCUMENTS

| | | | | |
|---|---|---|---|---|
| WO | WO 2011/117705 | * | 9/2011 | ............ C10G 1/00 |
| WO | 2017049271 A1 | | 3/2017 | |
| WO | 2017052454 A1 | | 3/2017 | |

OTHER PUBLICATIONS

International Search Report from PCT Application No. PCT/US2018/042103, dated Dec. 17, 2018.
Written Opinion from PCT Application No. PCT/US2018/042106, dated Oct. 12, 2018.
International Search Report from PCT Application No. PCT/US2018/042106, dated Oct. 12, 2018.

* cited by examiner

LIGNIN TO LIQUID FUELS AND POLYOLS USING BIOMASS-DERIVED SOLVENTS

CROSS-REFERENCE TO RELATED APPLICATIONS

This application is a U.S. National Phase under 35 U.S.C. § 371 of International Application No. PCT/US2018/042103, filed Jul. 13, 2018, which claims the benefit of U.S. Provisional Application No. 62/642,709, which was filed Mar. 14, 2018, and U.S. Provisional Application No. 62/532,801, which was filed on Jul. 14, 2017, the contents of which are hereby incorporated by reference in their entirety.

STATEMENT OF GOVERNMENT RIGHTS

This invention was made with government support under Contract Number DE-FE0023963 awarded by the US Department of Energy. The government has certain rights in the invention.

This invention relates in general to processes and systems for converting lignin, optionally along with some coal, to liquid hydrocarbons and, more particularly, to the production of liquid fuels. The invention also relates to methods of improving solubilization of lignin by transfer hydrogenation due to the action of hydrogen-donor, biomass-derived solvents.

BACKGROUND

As energy consumption in the United States and throughout the world continues to increase, additional methods for environmentally clean energy conversion that can convert lignin, biomass, or other solid or nonconventional heavy hydrocarbon energy resources to synthetic fuels, hydrogen, and chemicals are desired. Concerns about the increased wastes and pollutants produced by many of the conventional energy conversion processes, and the low efficiencies of such processes, have led to further research for cleaner, more efficient processes.

Lignin is a main component of lignocellulosic biomass (15-30% by weight, up to about 40% by energy), and is one of the most abundant renewable carbon sources on earth. The exact structure of virgin lignin (untreated lignin found in plants) is still unknown because it is affected by the extraction process. However, based on biosynthesis, lignin is thought to involve the polymerization of three primary monomers: p-coumaryl, coniferyl, and sinapyl alcohols. Global commercial production of lignin at the present time is a consequence of papermaking, but its production may increase substantially as more biorefineries are built. Kraft pulping itself produces over 50 million MT/year of lignin, 98% of which is burned.

Various processes have been evaluated for the conversion of lignin to more valuable materials, such as fuels, but these processes are much less developed than processes for carbohydrate conversion. Most importantly, any process for the conversion of lignin must be broadly capable of handling lignins produced by varying feedstocks and different extraction processes, such as the Kraft process, organosolv, cellulosic ethanol, or hydrothermal fractionation. The main processes for the conversion of lignin are hydrotreatment, pyrolysis, gasification (including indirect liquefaction via Fischer Tropsch (FT)), and direct liquefaction.

Lignin hydrotreatment has been evaluated for many years, but the process has been difficult due to catalyst deactivation. The conditions are typically 200-400° C. with 1000-2000 psi hydrogen in the presence of transition metal catalysts. Conversions are typically 49-71%, with the best conversions of 80% coming from organosolv lignin, and lower conversions from Kraft lignin. Low catalyst activity and short times before regeneration lead to increased costs.

Lignin pyrolysis has also been evaluated. It consists of exposing lignin for relatively short times to temperatures from 160-900° C., creating an oil product with residual char. Pyrolysis can be performed either in the presence or absence of catalyst. While acid hydrolysis and soda lignin gave conversions of 63% and 70% respectively, Kraft lignin was only converted up to 44%, and it tends to produce more char.

Lignin gasification is the process whereby lignin is fully decomposed to produce synthetic gas, which is either used as feed for a gas turbine to produce heat and power, or reacted over transition metal catalysts to produce liquid fuels. The major challenge with conventional gasification is that the product is of lower value, and any residual alkali leads to equipment corrosion. Supercritical water gasification can be run at lower temperature (>350° C.), but it requires very high pressure (about 3600 psi), and it typically involves transition metal catalysts. Lignin has been found to be resistant to supercritical water gasification, leading to low yields/conversion.

A key emerging technology for producing value added material from lignin is microbial degradation to produce bio-based adipic acid. Through the use of various enzymes, lignin is broken into various components that are funneled to eventually capture muconic acid. The muconic acid is then hydrogenated to adipic acid. While the technology shows promise, there is still further optimization and validation that needs to be performed.

The direct liquefaction of lignin via the use of a solvent and a means of adding hydrogen (i.e., hydroliquefaction) has been essentially unexplored Similar to coal-based hydroliquefaction, lignin can be liquefied using a catalyst, typically at $H_2$ partial pressure of at least 1000 psi. Attempts have been made to study the synergistic effects in co-liquefaction of coal and lignin or other biomass. In 1987, Altieri and Coughlin reported increased liquefaction of coal and lignin during co-liquefaction using tetralin as an H-donor solvent, in the presence of high-pressure hydrogen. More recently, Shui at Shenhua Energy observed a synergistic effect during co-liquefaction of coal and sawdust during catalytic hydroliquefaction. Recently, Kim reported using isopropyl alcohol as an H-donor solvent for catalytic hydrogenolysis of ionic liquid processed biorefinery lignin to phenolic compounds. The US Department of Energy has been supporting some work at the University of California-Riverside and Iowa State University on liquefaction using coal- or petroleum-derived solvents, but these processes depend on catalytic hydrogenation of the solvent, which is similar to Solvent Refined Coal (SRC I and II) processes developed in the 1970s and 1980s. The solubility of lignin in these previous efforts is moderate (50-70%), the product of liquefaction is typically solid at room temperature, and the economics of the resulting diesel has a breakeven crude oil price above $100/bbl.

Direct lignin liquefaction processes convert lignin into liquids by breaking down its organic structure with the application of solvents and/or catalysts in a high pressure and temperature environment. In some direct lignin liquefaction processes, the solvent causes dissolution of the lignin by transferring hydrogen from the solvent to the fragments of lignin generated during the initial thermal breakdown. Transferred hydrogen during liquefaction stabilizes the lignin fragments and avoids their recombination into tar-like, undesirable products. Such a process is known as "transfer hydrogenation", and such solvents are referred to as hydrogen-donor solvents. The "gold standard" for transfer hydrogenation and solubilization of coal is 1,2,3,4-tetrahydronaphthalene (tetralin). But tetralin is typically derived from fossil fuels and is expensive. Tetralin, like other hydrogen-donor solvents, undergoes dehydrogenation during coal liquefaction and needs to be regenerated in order to reduce the cost of make-up tetralin.

It would be desirable to provide a process for the production of liquid fuel products from lignin, optionally along with coal, using biomass-derived solvents. It would also be desirable to provide a process capable of producing jet fuels, other distillate fuels, and marine-fuel oil.

SUMMARY AND DESCRIPTION OF THE INVENTION

Figure 1:
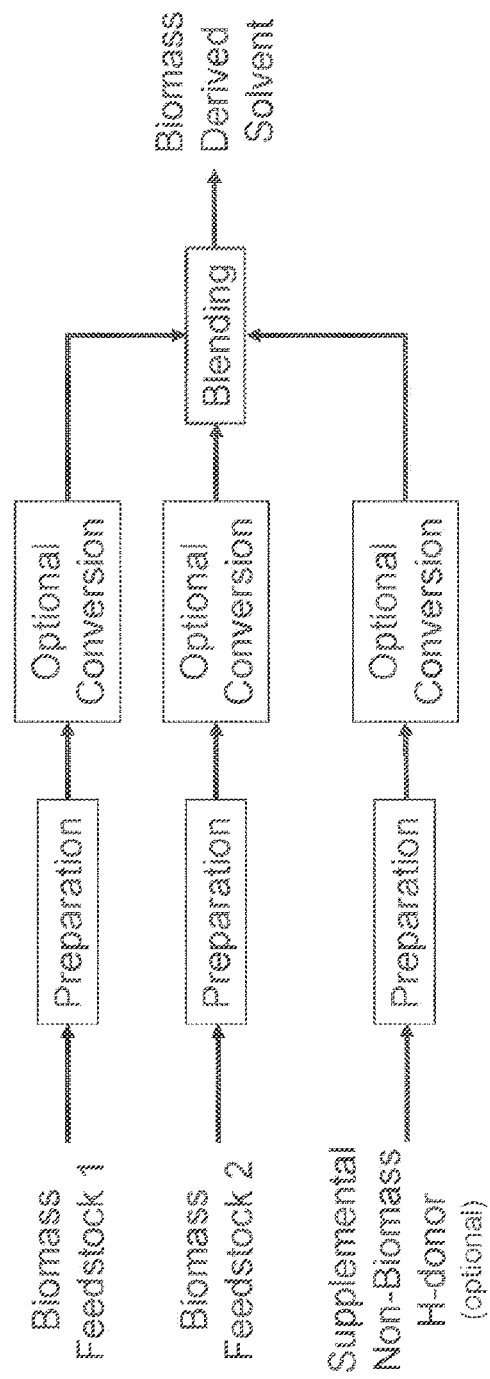
FIG. 1 is a flowchart of one embodiment of Subsystem 1 of the lignin-to liquids (LTL) process of the invention: the preparation of a biomass-derived solvent.

One aspect of the invention is a process of producing a distillate fuel from lignin. In one embodiment, the process comprises: preparing a biomass-derived lignin solvent; dissolving the lignin in the biomass-derived solvent; and separating undissolved lignin, and mineral matter to produce a synthetic crude (syncrude).

In some embodiments, the process further comprises subjecting the syncrude to at least one of a hydrotreatment process and a hydrogenation process to produce a distillate fuel.

In some embodiments, the lignin is dissolved without using molecular hydrogen and an added hydroliquefaction catalyst.

In some embodiments, the biomass-derived lignin solvent comprises a hydrogen-donor solvent.

In some embodiments, an H/C atomic ratio of the syncrude is at least 5% more than that of the lignin.

In some embodiments, an H/C atomic ratio of the syncrude is at least 20% more than that of the lignin.

In some embodiments, the biomass-derived solvent additionally comprises a second solvent that helps to slurry the lignin and/or depolymerize the lignin and/or solvate the lignin.

In some embodiments, the second solvent is a polyunsaturated bio-based oil.

In some embodiments, the process further comprises: mixing a coal-derived solvent with the biomass-derived lignin solvent to form a solvent mixture; and wherein dissolving the lignin in the biomass-derived lignin solvent comprises dissolving the lignin and coal in the solvent mixture.

In some embodiments, the coal-derived solvent comprises a coal tar distillate or a portion of the syncrude produced in the process.

In some embodiments, the coal-derived solvent includes a portion of partially hydrotreated coal-derived syncrude.

In some embodiments, the hydrogen-donor solvent has a cyclic ring with one or more double bonds on the ring without being fully aromatized.

In some embodiments, the hydrogen-donor solvent contains compounds that can dehydrogenate during lignin liquefaction.

In some embodiments, the hydrogen-donor solvent is prepared by conjugating double bonds in multiply unsaturated fatty acids.

In some embodiments, the hydrogen-donor solvent is prepared by appending cyclohexene groups in linoleic acids to produce a modified oil.

In some embodiments, the hydrogen-donor solvent is prepared by appending cyclohexene groups in oleic acids to produce a modified oil.

In some embodiments, the hydrogen-donor solvent comprises a dimer acid.

In some embodiments, the hydrogen-donor solvent comprises a bodied bio-based oil or fatty acid derivative.

In some embodiments, the hydrogen-donor solvent comprises a material produced from pine tree processing.

In some embodiments, the hydrogen-donor solvent comprises an oil produced by catalytic hydrothermolysis.

In some embodiments, the hydrogen-donor solvent has been chemically converted to improve its solvent usefulness before dissolving the lignin with the solvent.

In some embodiments, the hydrogen-donor solvent has been chemically converted by one or more of the following processes: esterification, hydrothermolysis, Diels-Alder reactions, dimerization, pyrolysis, hydrotreatment, or bodying.

In some embodiments, the process further comprises providing a biomass-derived coal solvent; and dissolving coal with the lignin in the biomass-derived lignin solvent and the biomass-derived coal solvent.

Another aspect of the invention is a process to improve direct lignin liquefaction. In one embodiment, the process comprises: using a non-hydrogenated lipid in a direct lignin liquefaction process to facilitate lignin depolymerization.

In some embodiments, the non-hydrogenated lipid is a polyunsaturated bio-based oil.

In some embodiments, the non-hydrogenated lipid is a soybean oil.

In some embodiments, the non-hydrogenated lipid is yellow grease or brown grease or its free fatty acids.

In some embodiments, the non-hydrogenated lipid is used in combination with a hydrogen donor solvent in the direct lignin liquefaction process.

In some embodiments, the hydrogen donor solvent is a biomass-derived hydrogen-donor solvent.

Another aspect of the invention is a process for using a biomass-derived feedstock as a hydrogen donor. In one embodiment, the process comprises: providing a biomass-derived feedstock; modifying the biomass-derived feedstock to improve its usefulness as a hydrogen donor; and conducting a transfer hydrogenation process using the modified feedstock as a hydrogen donor.

In some embodiments, the modification of the feedstock results in at least one of: improved stability, improved resistance to decomposition at elevated temperature, and improved solvent ability.

In some embodiments, the transfer hydrogenation process is a direct lignin liquefaction process.

In some embodiments, the modification comprises esterification, hydrothermolysis, Diels-Alder reactions, dimerization, pyrolysis, hydrotreatment, or bodying.

Another aspect of the invention is a process of producing a polyol from lignin. In one embodiment, the process comprises: preparing a biomass-derived hydrogen-donor solvent; introducing lignin to a reactor containing the biomass-derived hydrogen-donor solvent; heating the mixture to a temperature in a range of 250 to 450° C.; separating undissolved lignin, and mineral matter to produce a depolymerized lignin; and alkoxylating the depolymerized lignin to produce the polyol.

In some embodiments, the undissolved lignin and mineral matter are separated by filtration or centrifugation.

In some embodiments, the undissolved lignin and mineral matter are separated using a solvent.

In some embodiments, the depolymerized lignin is alkoxylated using ethylene oxide, propylene oxide, or combinations thereof.

In some embodiments, the undissolved lignin and mineral matter is separated using a solvent.

A hybrid, direct lignin-to-liquids (LTL) process is provided for producing a syncrude from lignin, optionally with some coal, using a biomass-derived lignin solvent, and for converting the syncrude into jet fuel and other distillate fuel such as gasoline or diesel. The process may offer a significant reduction in capital and operating costs compared with other lignin-to-fuels processes, as well as helping to meet the requirements of a secure jet fuel supply while requiring minimal blending with petroleum-based JP-8/Jet-A fuels.

The process may also offer a substantial reduction in greenhouse gas emissions, without requiring carbon capture and storage (CCS) at the lignin liquefaction site. The invention also relates to methods of improving solubilization of lignin by transfer hydrogenation. Testing has shown that a number of biomass-derived hydrogen-donor lignin solvents according to the invention can achieve greater than 80% lignin solubility. The lignin solubility levels in many cases are equal to or higher than for liquefaction with tetralin. For example, the solubility for a Kraft lignin at 400° C. and 30 minutes residence time with a biomass-derived solvent using a solvent/lignin weight ratio of 0.51 was 82.3% (on a moisture- and ash-free basis) compared to less than 70% literature reported values with tetralin, in the presence of hydrogen, at a solvent/lignin weight ratio of 0.60. This demonstrates that the biomass-derived BS-41A is a more effective, as well as a more efficient solvent than tetralin.

In certain embodiments, the lignin-to-liquids process includes three subsystems: (1) preparation of a biomass-derived lignin solvent; (2) lignin dissolution in the biomass-derived solvent, without use of molecular $H_2$, followed by separation of undissolved lignin and mineral matter to produce a syncrude; and (3) hydrotreatment/hydrogenation of the syncrude to produce jet fuel and other distillate fuels. Examples of the subsystems are described below.

In other embodiments, the lignin-to-liquids process includes two subsystems: (1) preparation of a biomass-derived lignin solvent; and (2) lignin dissolution in the biomass-derived solvent, without use of molecular $H_2$, followed by separation of undissolved lignin, and mineral matter to produce a syncrude. The syncrude may be sent to an existing petroleum refinery and used as a feedstock in the production of fuels and/or other materials. For example, it may be used to produce jet fuel, other distillate fuels, and chemicals. The syncrude may also be used as a low-sulfur fuel oil for marine vessels, or "marine-fuel oil".

Subsystem 1. Preparation of Biomass-Derived Lignin Solvent

FIG. 1 illustrates an embodiment of Subsystem 1 of the process: preparation of a biomass-derived lignin solvent. In certain embodiments, the biomass-derived lignin solvent may be a one- or multiple-component solvent.

The biomass-derived lignin solvent includes a hydrogen-donor solvent. The hydrogen-donor solvent is a fairly strong hydrogen-transfer solvent that can dehydrogenate and give up hydrogen to newly formed lignin fragments during the process of producing a syncrude from the lignin. This solvent may also solvate the lignin and lignin-derived fragments. FIG. 1 shows the preparation of a hydrogen-donor solvent from a Biomass Feedstock I. A number of different biomass-derived hydrogen-donor solvents according to the invention are described in more detail herein below.

Optionally, the biomass-derived hydrogen-donor solvent can be chemically converted/modified to improve its usefulness as a hydrogen-donor solvent in the present process. For example, the conversion may result in at least one of: improved stability, improved resistance to decomposition at elevated temperature, improved solvent ability, and removal of non-useful matter in the biomass feedstock. The conversion is described in more detail herein below.

In some embodiments, the biomass-derived lignin solvent includes a second biomass-derived solvent in addition to the hydrogen-donor solvent. FIG. 1 shows the preparation of the second solvent from a Biomass Feedstock II. When coal is included, the second solvent can help to slurry/depolymerize/solvate the lignin and coal during the process of producing a syncrude from the lignin and coal. In certain embodiments, the second solvent may enhance the action of the hydrogen-donor solvent and/or it may provide a desired aliphatic-aromatic balance in the jet fuel and other distillate products. In other embodiments, the second solvent may help to increase the hydrogen content of the lignin-derived syncrude, in order to reduce the cost of upgrading the syncrude to distillate fuels. A number of different second biomass-derived solvents according to the invention are described in more detail herein below.

As shown in FIG. 1, the biomass-derived hydrogen-donor solvent is blended with the second biomass-derived solvent (if present) to produce the biomass-derived lignin solvent for use in Subsystem 2 of the process. Optionally, one or more additional hydrogen donor solvents, whether biomass derived or from fossil sources such as hydrogenated CTD or hydroaromatics-rich streams from petroleum refineries, may be included in certain embodiments.

Advantageously, the biomass may be converted to bio-solvent in a small, distributed plant (e.g., less than 100 tons/day (TPD), for example about 50 TPD) near the sources of biomass so the energy and cost required for biomass transport are greatly reduced. Additionally, the bio-solvent is easily pumpable compared to cellulosic and other plant mass.

Subsystem 2. Lignin Dissolution in Biomass-Derived Solvent

Figure 2:
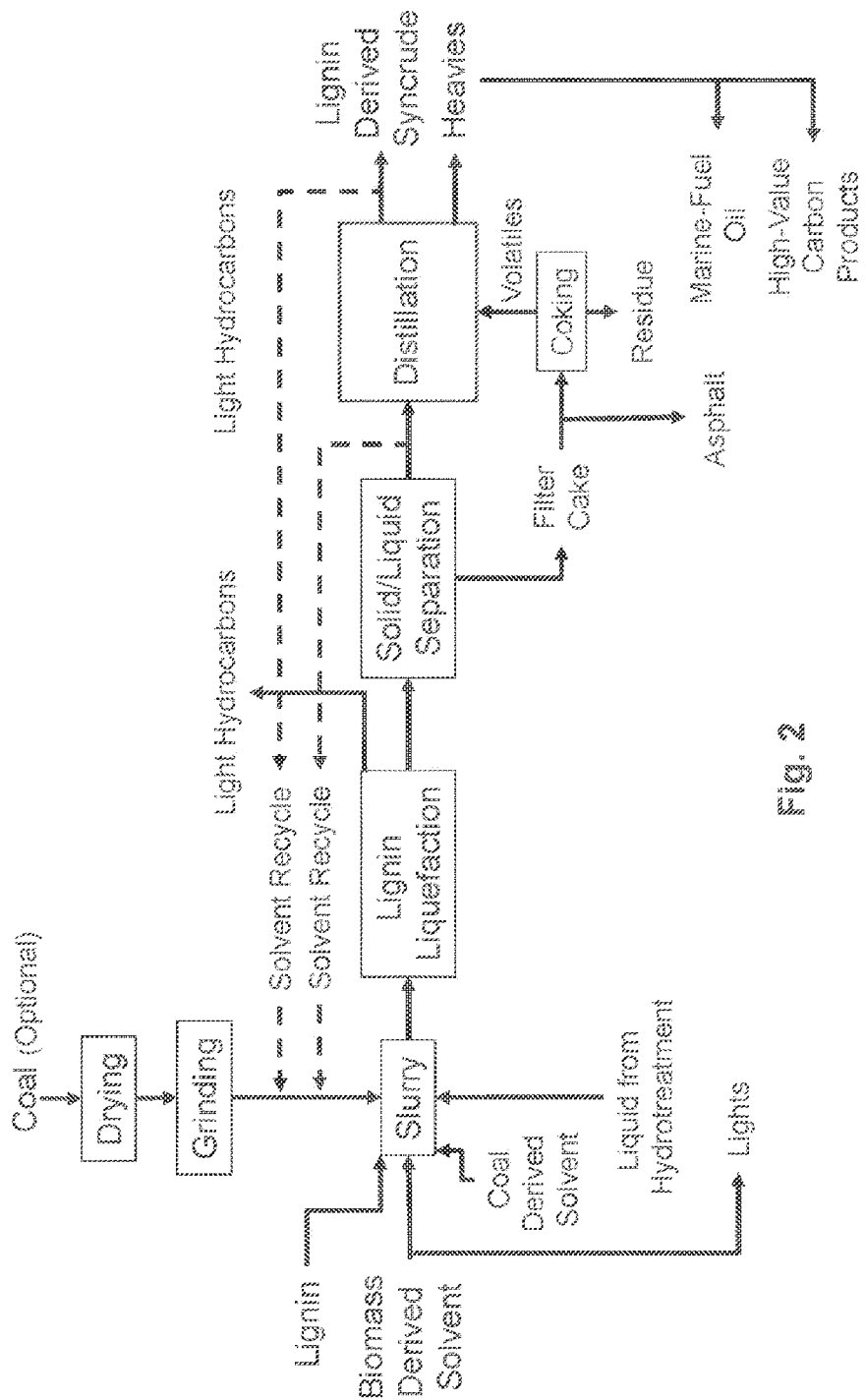
FIG. 2 is a flowchart of one embodiment of Subsystem 2 of the process: lignin dissolution/demineralization and hydrogen transfer to produce a lignin-derived syncrude.

FIG. 2 illustrates an example of Subsystem 2 of the process: lignin, optionally along with some coal, dissolution/demineralization and hydrogen transfer in the biomass-derived solvent.

In the embodiment shown, the biomass-derived solvent from Subsystem 1 of the process is pumped to a slurry preparation vessel. Optionally, a portion of the biomass-derived solvent, which is already in the distillate fuel boiling point range, may be sent to hydrotreatment/hydrogenation along with the lignin-derived syncrude.

Figure 3:
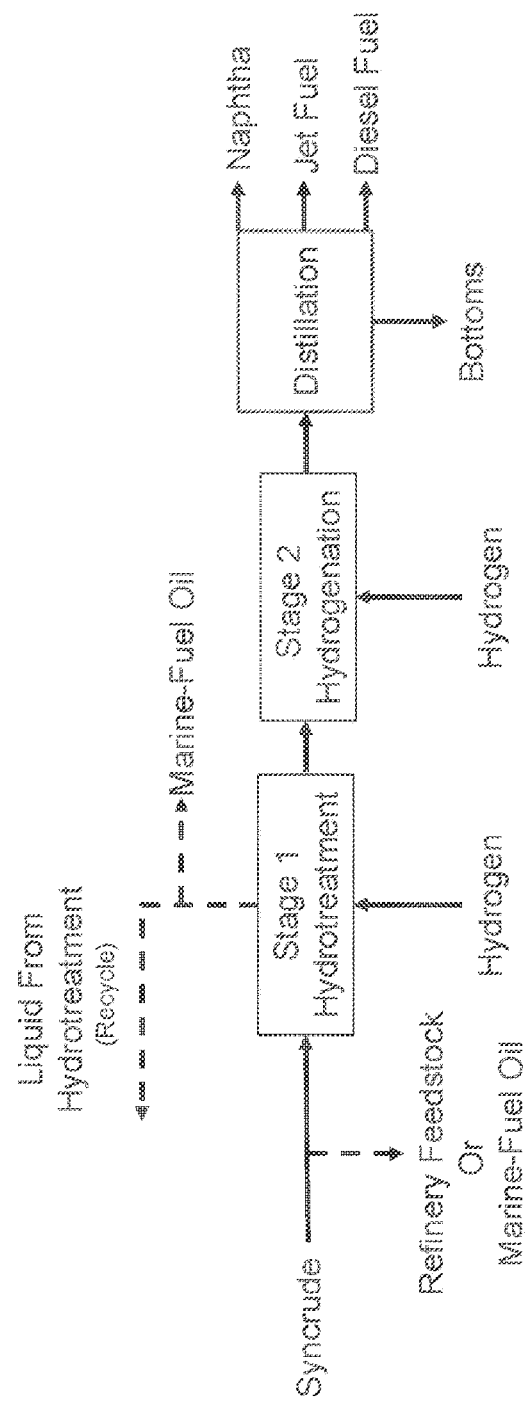
FIG. 3 is a flowchart of one embodiment of Subsystem 3 of the process: two-stage hydrotreatment/hydrogenation of the lignin-derived syncrude to produce jet fuel and other distillate fuels.

Typically, when coal is present, a coal-derived solvent, or a petroleum-derived solvent is also pumped to the slurry prep vessel to provide a sufficient amount of liquid to slurry the coal. For example, the coal-derived solvent may be a coal tar distillate (CTD). Different types of coal-derived solvents are described herein below. In certain embodiments, the lignin-derived syncrude, and/or the middle-boiling-point fraction of it, is recycled to eliminate or greatly reduce the CTD, so the CTD essentially becomes a start-up solvent. In certain embodiments, a portion of the lignin liquefaction product from the present process (e.g., the "liquid from hydrotreatment" as shown in FIGS. 2 and 3) may be recycled to further enhance the solvation capability of the biomass-derived solvent. The coal-derived solvent has functional groups, e.g., aromatic and hydroaromatic compounds, that have affinity for coal; these groups help to depolymerize/solvate the coal. The solvents are mixed in the slurry prep vessel.

The process can be used with any type of lignin and any type of coal (if present) mixed in if desired, including, but not limited to, Kraft lignin, alkali pulping lignin, organosolv lignin, hydrothermal fractionated, and ethanol production lignin. The lignin may be dried, ground to a reduced size sufficient for dissolution, and then pumped to the slurry prep vessel along with the solvent(s). The lignin and solvent(s) are mixed together to form a slurry.

In certain embodiments (not shown), water is removed from the slurry before the lignin liquefaction step. For example, the slurry may be passed through a colloidal mill or a suitable slurry-mix tank which heats and recirculates the slurry to drive off water.

The slurry is fed to a digester for lignin liquefaction. The slurry is heated in the digester to dissolve the lignin and to transfer hydrogen from the biomass-derived solvent(s) to lignin-derived fragments/molecules. The lignin liquefaction may be conducted using any suitable process conditions. For example, the temperature may be within a range from about 300° C. to about 475° C., or from about 325° C. to about 450° C. The pressure may typically be within a range of from about 400 psi to about 1200 psi, or from about 500 psi to about 900 psi, depending on the vapor pressure of the solvent(s). The slurry is held in the digester for a residence time suitable for lignin liquefaction, for example a time of from about 2 minutes to about 120 minutes, or from about 5 minutes to about 45 minutes. In certain embodiments, two digesters in series are used in the process, and the reaction conditions are adjusted accordingly.

As the lignin is heated in the liquid solvent(s), the lignin begin to depolymerize where lignin macromolecules break up, due to thermally-induced chemical bond cleavage, into smaller, still fairly large molecular weight fragments. The fragments are deficient in hydrogen and will recombine (repolymerize) to make heavy tar or eventually coke if hydrogen is not quickly transferred to these fragments. The biomass-derived hydrogen-donor solvent rapidly provides the much needed hydrogen and thereby prevents repolymerization of the lignin fragments. For example, in the absence of any biomass-derived or other hydrogen-donor solvent like tetralin, the product of liquefaction at 400° C. was impossible to filter because of its tar-like, high-viscosity consistency, while the product with biomass-derived solvent was easy to filter and had viscosities that were 1-2 orders of magnitude lower.

While the process can work well with lignin alone, we have observed a synergistic effect of adding some coal to the lignin feed. The solubilities for a Kraft lignin and coal alone were 82% and 90%, respectively. When a mixture of 25% lignin and 75% coal was used, the observed solubility was 93%, as opposed to a predicted value of 88%. This was a significant discovery because it showed that almost 40% of otherwise undissolved feedstock was dissolved due to a synergistic effect. This discovery is especially important in that there is 40% less syncrude lost, which is trapped in the filter cake, with the undissolved matter.

The present lignin liquefaction process may provide a number of advantages compared with previously known processes. For example, catalytic hydroliquefaction is considered the state-of-the-art, whereby molecular hydrogen at a pressure typically over 2000 psi is first dissolved in a lignin-derived solvent, and then a solid-phase catalyst rather slowly transfers the dissolved hydrogen to the lignin fragments. In the present process, the elimination of the need for catalyst, high pressure, and longer liquefaction times are major simplifications compared with the catalytic hydroliquefaction process. Furthermore, the state-of-the-art processes are also complicated due to the need to regenerate the lignin solvent, including any hydrogen-donor solvent, to keep the overall process in "solvent balance". However, in the present process the biomass-derived solvents, which contain the needed hydrogen for transfer hydrogenation, can be used on a once-through basis, thus eliminating the need to regenerate the solvent during the lignin liquefaction subsystem.

Some previously known "solvent refining" processes produce a dissolved lignin product which is solid at room temperature as very little hydrogen is added. In contrast, the present process significantly increases the hydrogen content of the dissolved lignin fraction as the biomass-derived hydrogen-donor solvent is rich in hydrogen. The syncrude thus produced has at least 5% and typically over 20% more hydrogen than the starting lignin. In an example, the hydrogen to carbon atomic ratio, H/C, for lignin was 1.1, while the H/C for the syncrude was 1.3.

Referring again to FIG. 2, the product from the digester is depressurized, cooled, and then fed to a solid/liquid separation device, such as a centrifuge or filter. In the solid/liquid separation step, undissolved lignin and liberated mineral matter is separated from the liquefied lignin. The separated solids (called the "filter cake") can be used as an asphalt additive, burned to generate heat, or gasified to generate syngas. Optionally, the filter cake can be coked to recover trapped lignin-derived syncrude and a high ash residue. The syncrude ("volatiles") may be combined with the liquefied lignin in a distillation step. The high ash residue may be used as a feedstock for road aggregate or other suitable application.

The liquefied lignin from the solid/liquid separation is fed to any suitable type of distillation device to split the liquefied lignin into low-, middle- and high-boiling fractions. The low-boiling fraction (light fraction) and the middle-boiling fraction (middle fraction) are recovered as a lignin-derived syncrude according to the invention. The typical upper boiling point of the middle fraction is 450-500° C. The very light hydrocarbons (liquefied petroleum gases and various carbon oxides) from the dissolver and the distillation column are combined and then are typically burned to produce electricity. The syncrude is a low viscosity liquid. In certain embodiments, the viscosity of the syncrude is in the 10 to 300 centipoise (cP) range. The syncrude is sent for hydrotreatment/hydrogenation in Subsystem 3 of the process.

In certain embodiments, as shown in FIG. 2, a portion of the middle fraction is recycled for slurrying the lignin. In other embodiments, a portion of undistilled liquid from the solid/liquid separation step is also recycled for slurrying lignin.

The high-boiling fraction (heavy fraction) ("Heavies" in FIG. 2) can be sold as binder pitch or coked to recover more liquefied lignin and produce a high-value coke. A portion of the heavy fraction can be recycled to the slurry prep vessel.

Advantageously, smaller lignin liquefaction plants (e.g., 300-1000 TPD), typically located near a source of lignin and coal, if used, are economical to use with the present process due to the use of non-catalytic, mild conditions that do not require the use of molecular hydrogen and the associated infrastructure to produce hydrogen, so lignin transportation energy and cost are reduced as well.

Subsystem 3. Hydrotreatment/Hydrogenation of Syncrude

FIG. 3 illustrates an embodiment of Subsystem 3 of the process: hydrotreatment/hydrogenation of the lignin-derived syncrude to produce jet fuel, diesel fuel, naphtha, and optionally, gasoline.

In certain embodiments, the hydrotreatment/hydrogenation is a two-stage process. In other embodiments, it is a one-stage process. In some further embodiments, the hydrotreatment/hydrogenation is a one-stage process used to produce a fuel, which may be a distillate fuel or another type of fuel, such as a low-sulfur marine diesel.

As shown in FIG. 3, the lignin-derived syncrude from Subsystem 2 of the process is fed to a reactor for the Stage 1 hydrotreatment process. Stage 1 is designed to remove the major heteroatoms found in lignin and/or coal (if present): nitrogen (none in lignin), oxygen and sulfur (N, O, and S, respectively). To free N (hydrodenitrogenation, or HDN), O (hydrodeoxygenation, or HDO), and S (hydrodesulfurization, or HDS) from the carbon backbone, the process hydrocracks and breaks the connecting bonds, allowing these atoms to be freed and subsequently reacted with gaseous hydrogen ($H_2$) for conversion primarily into ammonia ($NH_3$), water ($H_2O$), and hydrogen sulfide ($H_2S$). In an example, the coal syncrude hydrotreatment achieved 99.7% HDN (reduction of N from 7,200 ppm wt % to 21 ppm wt %) and 99.7% HDS (reduction of sulfur from 5,552 ppm wt % to 17 ppm wt %). The 17 ppm sulfur remaining was significantly better than the 3,000 ppm wt % Jet A sulfur limit. The syncrude derived from lignin, or lignin and coal, is expected to perform similarly in hydrotreatment. In certain embodiments, the hydrotreatment can reduce greater than 99.9% of the nitrogen and greater than 99.9% of the sulfur. In certain embodiments, the residual oxygen is reduced to below the analysis limit.

At the same time, hydrogen is added at the sites of the bonds breakage allowing the H/C ratio (hydrogen to carbon atomic ratio) to be increased. The process also reduces aromaticity by converting some aromatics to hydroaromatics and cycloparaffins. For example, the process results in significant conversion of molecules such as phenols from lignin and naphthalene from coal. In an example, the H/C mole ratio is increased from 1.0 (in the feed) to 1.4 after the hydrotreatment.

An option exists to recycle a portion of the product from Stage 1 to lignin liquefaction (Subsystem 2) to increase the amount of hydrogen-donor capacity.

The product from Stage 1 is fed to a Stage 2 hydrogenation process. The processes of Stage 1 and Stage 2 may be conducted in different zones of a single reactor or conducted in different reactors. Stage 2 is designed to achieve hydrodearomaticization (HDA) by additional hydrocracking to chop the liquefied lignin molecule into a carbon-number range (and boiling range) consistent with distillate fuels. In certain embodiments, the product of the hydrogenation process has a molecular length in the jet and diesel carbon-number range. For example, the product may have a carbon number distribution within a range from about carbon number 8 to about carbon number 17. Further HDN, HDO, and HDS is also achieved in Stage 2 as more bonds are cracked. This additional hydrogenation further improves the H/C ratio to above about 1.75.

The product from Stage 2 is fed to a distillation process. The distillation process is designed to first distill the cracked liquids to remove gases and naphtha (light hydrocarbon liquids like propane, butane and pentane). In a subsequent vacuum column, the distillate fraction (molecules in the jet and diesel boiling range) are separated from the partially upgraded but still "heavy" fraction (high-molecular weight, high-boiling material collected from the bottom of the vacuum column). The bottoms may be recycled back to Stage 2 for further cracking—so it is not necessary to reduce all the molecules to the $C_8$ to $C_{17}$ jet range or the $C_{12}$ to $C_{22}$ diesel range in a single pass to achieve success.

Because the hydrotreatment/hydrogenation is typically conducted in two stages, different catalysts and different operating parameters may be employed to effect the desired conversion. The catalysts and operating conditions can be selected to optimize the quality and yield of jet fuel fraction. Any suitable catalysts can be used. For example, NiMo and CoMo catalysts may be used in Stage 1 for removal of the heteroatoms (O, N and S) components and to partially hydrogenate aromatic compounds. NiW, Pt and PtPd are examples of catalysts that may be used in Stage 2 to complete the upgrading of the syncrude to a jet fuel or diesel product.

Also, any suitable operating conditions can be used. For example, the Stage 1 reaction may be operated at a temperature within a range from about 340° C. to about 425° C., a pressure within a range from about 600 psi to about 1500 psi, and a hydrogen/syncrude volume ratio within a range from about 3,000 scf/bbl to about 20,000 scf/bbl. For example, the Stage 2 reaction may be operated at a temperature within a range from about 200° C. to about 400° C., a pressure within a range from about 500 psi to about 1500 psi, and a hydrogen/syncrude volume ratio within a range from about 3,000 scf/bbl to about 20,000 scf/bbl.

High Hydrogen-Donor Biomass-Derived Lignin Solvents

Select biomass-derived materials are used both to dissolve and hydrogenate lignin. The term "biomass" in general refers to renewable organic materials, such as wood, agricultural crops, energy crops, or wastes. The biomass-derived solvent used in the invention is capable of dehydrogenation and can be used in varying amounts in order to vary the properties of the final syncrude. In certain embodiments, the solvent is derived primarily or solely from a non-food biomass.

In certain embodiments, in order to dehydrogenate readily, the biomass-derived solvent has multi-cyclic compounds, such as cyclic alcohols, cyclo-olefins, and hydroaromatics, with one or more double bonds on the ring without being fully aromatized. In certain embodiments, the biomass-derived solvent has significant amounts of multi-cyclic compounds (e.g., greater than 20%). The biomass-derived solvent may have a hydroaromatic cyclic structure that can be more fully aromatized on transfer of hydrogen during lignin liquefaction. In Subsystem 3, these can be easily hydrogenated back to the hydroaromatic state for potential recycling to Subsystem 2.

In certain embodiments, modifications of biomass-derived materials are provided that significantly enhance their hydrogen donation properties and thereby improve their capabilities as lignin solvents. Also, certain modifications will produce aromatic rings during transfer hydrogenation which should lead to the down-stream production of jet fuels with increased densities due to the increased content of cyclic compounds.

The high hydrogen-donor biomass-derived lignin solvents described herein below can be used in the lignin-to-liquids process of the invention, or they can be used in any other process involving hydro-refining of lignin or other carbonaceous feedstocks by transfer hydrogenation.

1) Conjugating Double Bonds in Multiple Unsaturated Fatty Acids

Linoleic acid is the most prevalent fatty acid in vegetable oils such as soybean oil and, as shown below, has two double bonds separated with a methylene group. One method to activate linoleic acid towards transfer hydrogenation of lignin is to bring these two double bonds into conjugation with each other by applying any of a number of catalysts and reaction conditions. These conjugated diene systems are combinations of trans and cis configurations and their positions range between $C_8$-$C_{11}$ and $C_{10}$-$C_{13}$. These conjugated dienes should facilitate further hydrogen loss in transfer hydrogenation by generating extended conjugated systems as also shown below. This method can also be used with other oils/lipids and other multiply unsaturated fatty acids.

Activation of Linoleic Acid in Triglycerides towards Hydrogen Release by Migrating Double Bonds to Conjugated Diene System

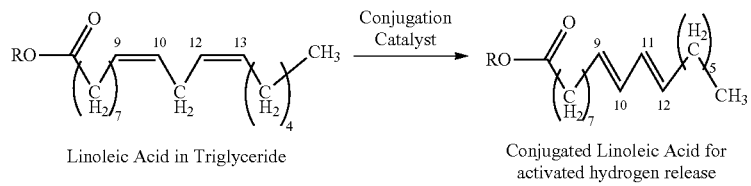

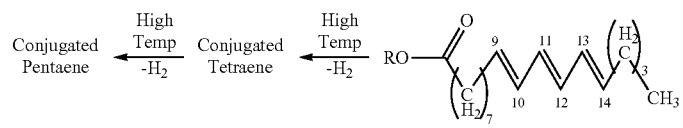

2) Generation of Appended Cyclohexene Groups in Linoleic Acid in Biomass-Derived Oils/Lipids Another method to activate linoleic acid starts with conjugated linoleic acid (CLA) or derivatives such as esters and amides and then performing a Diels Alder reaction with ethylene or substituted ethylene as shown below. This material may be called the Diels Alder product of CLA or DACLA for short. Many methods exist for preparing these appended cyclohexene derivatives from conjugated linoleic acid or, alternatively, directly from non-conjugated linoleic acid where the conjugation occurs in-situ. Diels Alder products resulting from these reactions have an appended cyclohexene group that is the focal point for effective transfer hydrogenation. Loss of two pairs of hydrogen atoms will convert this cyclohexene ring into a benzenoid aromatic ring which will be driven by the release of approximately 36 kcal/mole. Also, when processing the mixture of DACLA and solubilized lignin by hydrotreating to prepare jet fuels, these aromatic rings will probably be converted to cyclohexane rings. This will provide an additional approach to generating cycloalkanes which contribute to increased fuel densities which is a highly desirable jet fuel property. It can also be seen below that continued hydrogen release after generation of the aromatic ring may occur due to extended conjugation with the aromatic ring.

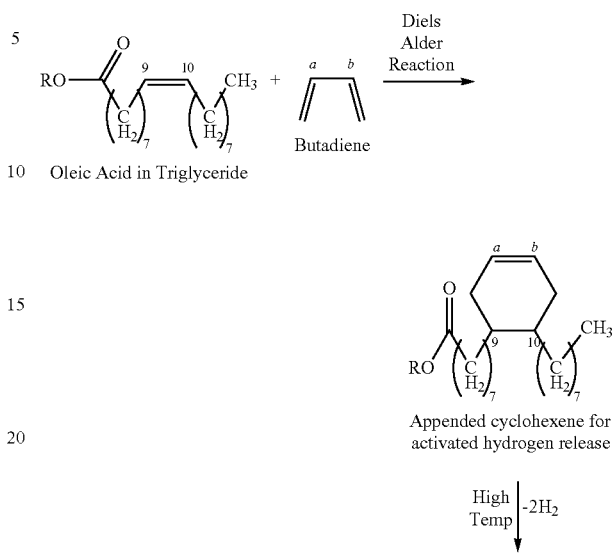

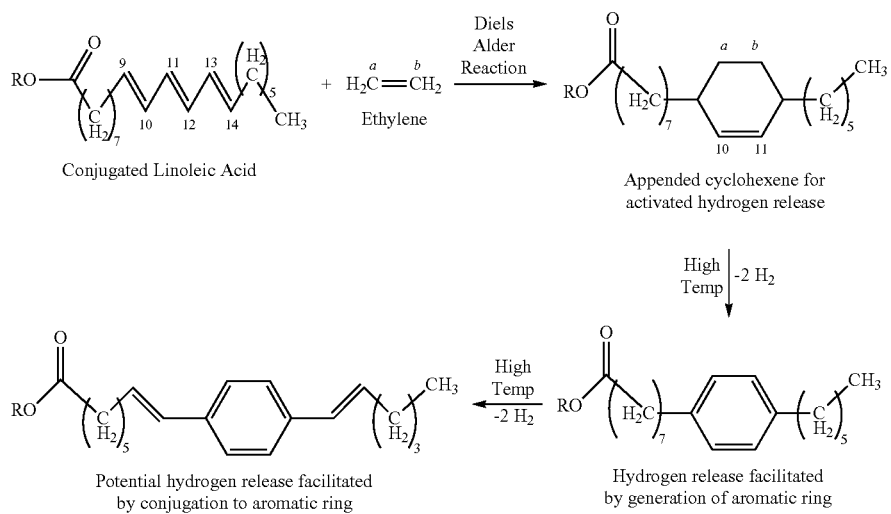

3) Generation of Appended Cyclohexene Groups in Oleic Acid in Biomass-Derived Oils/Lipids Oleic acid or derivatives such as fatty acid esters and amides have a single double bond and as shown below can also participate in a Diels Alder Reaction with butadiene or substituted butadienes to generated appended cyclohexene derivatives. As is the case in the Diels Alder reaction of conjugated linoleic acid, the appended cyclohexene ring in this oleic acid derivative is also activated towards the transfer hydrogenation of lignin. This is because the loss of two moles of hydrogen will generate a benzenoid aromatic ring which provides a very strong driving force due to the release of about 36 kcal/mole of energy. As mentioned above, creation of benzenoid rings during transfer hydrogenation of lignin should lead to beneficial increased amounts of cyclohexane rings in jet fuels produced during the hydrotreating step.

-continued

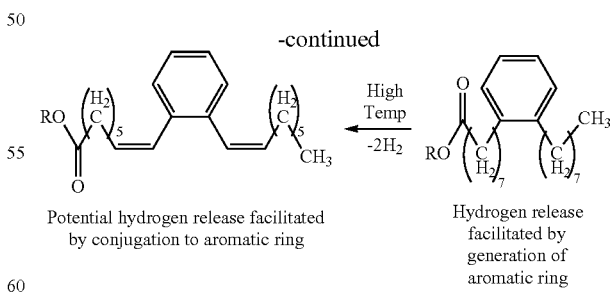

When modifying soybean oil or other oils that contain appreciable amounts of both linoleic and oleic acid by the Diels Alder cyclization approach, these oils may be reacted sequentially with appropriate ratios of ethylene and butadiene (and their derivatives) to form Diels Alder adducts of both linoleic and oleic acids or derivatives such as esters and amides of fatty acids. Sequential addition of ethylene and butadiene (or derivatives) may be used to prevent non-desired Diels Alder cross reactions of ethylene and butadiene systems with each other.

4) Dimer Acids

Dimer acids are made by treating fatty acids with various clays at high temperature in order to react at the double bonds of two fatty acids. They can form a cyclic ring, such as a cyclohexene ring, at the center of addition by Diels-Alder chemistry. They sometimes make small amounts of trimer acid also. The cyclic ring can participate in the transfer hydrogenation of lignin. The cyclic ring will also be prone to aromatization and thus facilitate transfer hydrogenation. It is preferred that the cyclic ring formed contains a double bond as the saturated form would be more stable and less prone to dehydrogenation. The dimer acids in aliphatic carboxylic acid form are stable and can be heated to high temperature without decarboxylation which would lead to high pressures. However, good results could also be expected from select esters or amides of the dimer acids.

5) Esters and Amides of Fatty Acids

Fatty acid esters and fatty acid amides could also serve as hydrogen donors.

6) Bodied Lipids

A similar process could be done to soybean oil, lipids from plants, or fatty acid esters directly by a process called bodying. A catalyst such as anthraquinone is used with heat in order to cyclize the fatty acids of soybean oil or fatty acid esters thereof. The temperature may be controlled so that aromatization does not take place before use in the present lignin-to-liquids process. Below is the proposed structure process for such reactions along with the dehydrogenation. It is believed that double bond conjugation occurs in one of the polyunsaturated fatty acid esters and that Diels Alder chemistry generates the substituted cyclohexene ring.

7) Materials Produced from Pine Tree Processing

Another class of hydrogen-donor biomass-derived lignin solvents is materials produced from pine tree processing. The main materials are turpentine, phytosterols, and rosin acids. The main chemical in turpentine is pinene, which has the potential for hydrogen transfer during lignin liquefaction.

The second pine chemical is phytosterols. The component structures vary but they are derivatives with similar structures to cholesterol. The structure contains 4-5 rings with the majority containing one double bond, allowing for potentially 3 or more moles of hydrogen per 387 grams to be transferred to lignin or coal; assuming also that some isomerization also takes place. Following is a potential dehydration/dehydrogenation process for cholesterol.

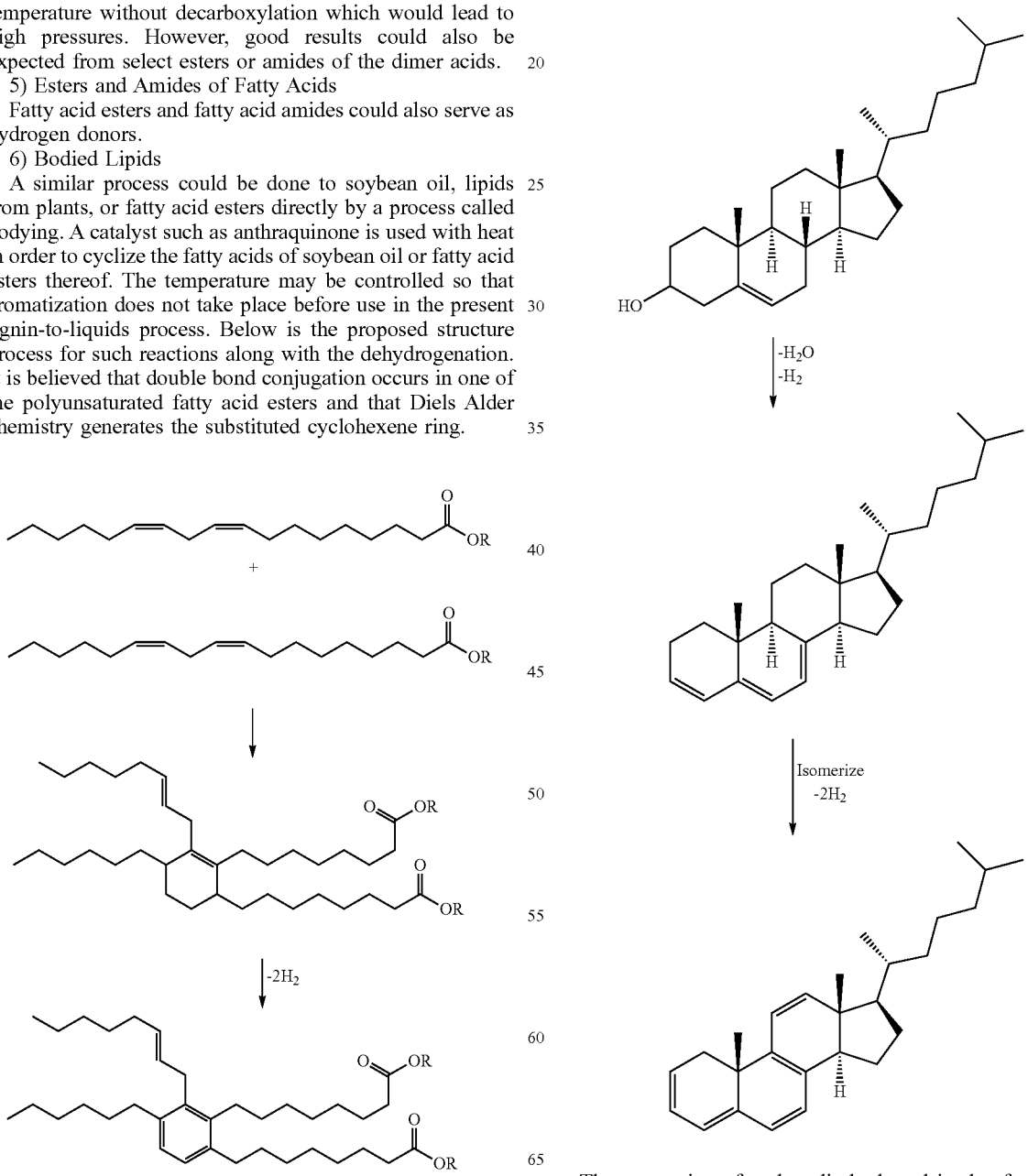

The possession of a phenolic hydroxyl is also favorable because cresol structures aid in lignin and coal solvation.

The only possible concern with sterol is the high melting point of 140° C. and high boiling point of 360° C. Hydrotreatment could remediate the melting and boiling point concerns. There are many sources of phytosterols with examples including pine trees and soybean oil production.

Another pine chemical is rosin acids. Rosin acids are typically obtained from Kraft-pulping processes or gum rosin production. Small amounts can be found in other conifers or guayule.

The other rosin acids are derivatives with similar structures. Like phytosterols, rosin acids contain multiple ring structures containing one or more double bonds. This structure allows for dehydrogenation to take place, thus facilitating transfer hydrogenation.

8) Solvent Produced by Rapid Hydrothermolysis of Oils

Another hydrogen-donor biomass-derived lignin solvent is produced by rapid hydrothermolysis of a variety of oils, including vegetable oils, non-edible plant oils, energy crop-derived oils, and algae. For example, a catalytic hydrothermolysis (CH) process has been developed by Advanced Research Associates and is described in U.S. Pat. No. 7,691,159, which is incorporated by reference herein. The CH process converts some of the straight-chain, aliphatic molecules to cyclics/aromatics as well as polyolefins. The patent discloses use of the resulting oils as biofuels. The present process may modify the CH oils to alter the quantity and type of cyclics/aromatics in order to optimize the lignin solvent properties.

Conversion of Hydrogen-Donor Biomass-Derived Lignin Solvents

Optionally, the biomass-derived hydrogen-donor solvent can be chemically converted/modified to improve its usefulness as a hydrogen-donor solvent in the present lignin-to-liquids process. For example, the conversion may result in at least one of: improved stability, improved resistance to decomposition at elevated temperature, and improved solvent ability.

More generally, in one embodiment, the present invention relates to a process for using a biomass-derived feedstock as a hydrogen-donor. The process comprises: providing a biomass-derived feedstock; modifying the biomass-derived feedstock to improve its usefulness as a hydrogen-donor; and conducting a transfer hydrogenation process using the modified feedstock as a hydrogen-donor.

In certain embodiments, the transfer hydrogenation process is a direct lignin liquefaction process.

A number of different methods can be used for converting/modifying a biomass-derived hydrogen-donor. For example, the DACLA solvent shown above is a carboxylic acid. The carboxylic acid can be esterified or amidified in order to stabilize the molecule by decreasing the chance for decarboxylation or improving properties through the reactant. Below are four examples of esters and amides of the DACLA solvent. Other reactants such as glycerol, ethylene glycol, propylene glycol, and other alkyl alcohols amongst many others can be used to control properties.

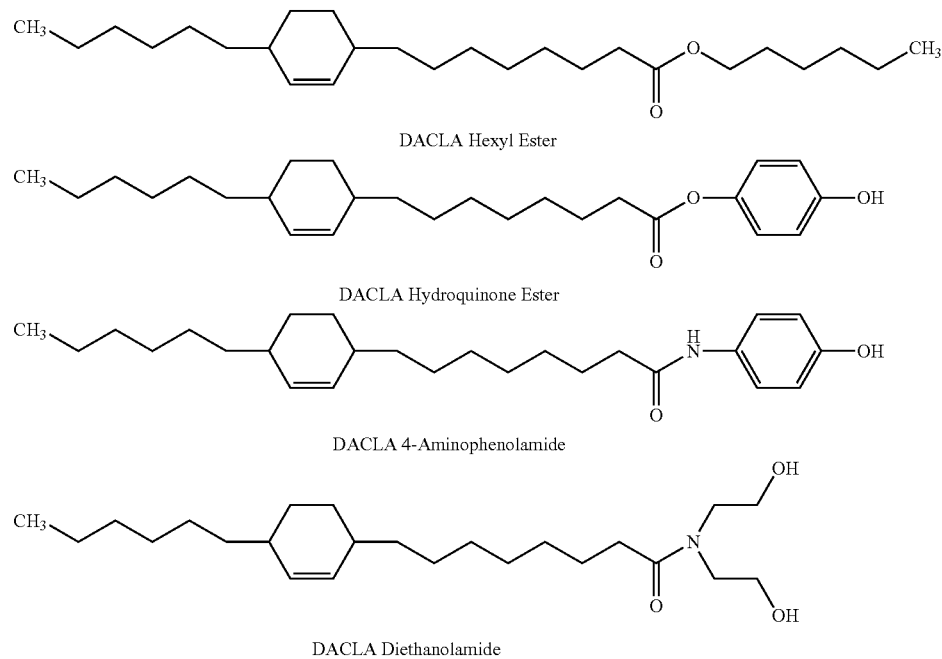

9) Tetrahydrofuran (THF) Diols

Tetrahydrofuran diols, or its esters with biomass-derived organic acids, can also be used as hydrogen transfer agents. These diols can be obtained from a number of sources. For example, epoxidized methyl linoleic rearranges to THF diol in greater than 90% yield when contacted with alumina or aqueous acid at ambient temperature, while epoxidized methyl soyate (normal variety) rearranges to 74% THF diols when exposed to acids.

Another way to get cyclic components into the fatty acid, ester, or amide is by the formation of tetrahydrofurans at the olefinic sites where two or more double bonds are in close proximity. This enhancement is due to the fact that THF groups readily lose two moles of hydrogen when sufficiently heated in converting to aromatic furan structures. One other way to get a THF group onto a fatty acid is to esterify with tetrahydrofurfuryl alcohol. For example, tetrahydrofurfuryl alcohol (typically made by reduction of furfural) when esterified to various carboxylic acids that themselves have hydrogen transfer abilities significantly enhances the overall hydrogen transfer properties of those esters.

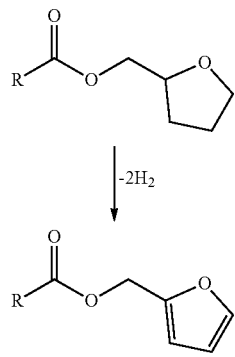

THF diols, as described above, can be used for their hydrogen transfer capabilities. For example, rearrangement of epoxidized vegetable oil will generate THF diols that can be esterified with carboxylic acids to provide extra hydrogen transfer capabilities to carboxylic acids already bearing hydrogen transfer ability. Following is an example of the process where the THF diol formed from soy fatty acid esters showing carboxylic acids already bearing hydrogen donating functionality esterified to the THF diol release two extra moles of hydrogen:

ing ethanol, butanol, hexanol, glycerol, tetrahydrofurfuryl alcohol, and 2-methylpropane-diol.

Second Biomass-Derived Solvents

As described above, in some embodiments the biomass-derived lignin solvent includes a second biomass-derived solvent in addition to the hydrogen-donor solvent. The second solvent can help to slurry/depolymerize/solvate the lignin during the process of producing a syncrude from the lignin. It may enhance the action of the hydrogen-donor solvent. The second solvent may provide a hydrogen-rich precursor for the jet fuel or other distillate product and/or provide a desired aliphatic-aromatic balance in the product.

Any suitable biomass-derived material can be used as the second solvent. In certain embodiments, the second solvent is a lipid. Some nonlimiting examples of lipids include soybean oil, corn oil, canola oil, brown grease, yellow grease, tallow, fish oils, cottonseed oil, rapeseed oil, sunflower oil, safflower oil, palm kernel oil, sesame oil, almond oil, argan oil, borage oil, castor oil, algal oil, coconut oil, linseed oil, grape seed oil, hemp oil, jojoba oil, macadamia oil, mustard oil, neem oil, shea butter, onka bean oil, Carinata, Jetropha, and tung oil. Combinations of different lipids, esters, amides, and mixtures thereof can be used.

In certain embodiments, the lipid(s) are converted to free fatty acids via thermal or other treatments for use as the second solvent.

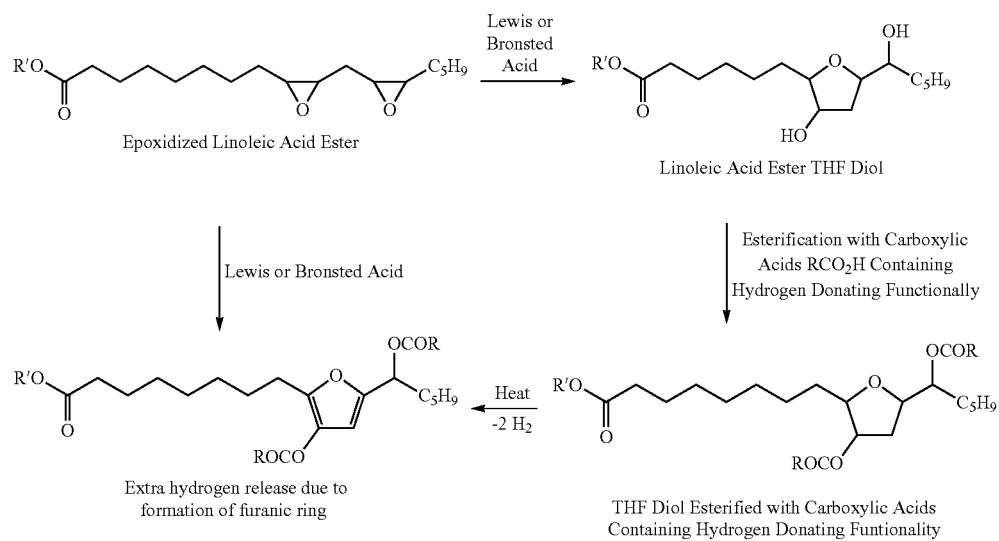

Some organic acids may undergo undesired decarboxylation during the lignin-to-liquids process. These acids can be esterified or amidified in order to stabilize the molecule by decreasing the chance for decarboxylation.

In addition to DACLA and organic acids, other types of hydrogen-donor biomass-derived lignin solvent can be optionally be converted for use in the present process. The following is a partial list of potential conversion chemistries available for enhancing the solvent properties of various biomass-derived solvents: esterification, hydrothermolysis, Diels-Alder reactions, dimerization, pyrolysis, hydrotreatment, and bodying. A large number of alcohols/polyols can be used for making esters of biomass-derived acids, includ- In certain embodiments, the second solvent is a virgin, preferably polyunsaturated oil. For example, it may be a polyunsaturated biobased oil such as polyunsaturated soybean oil.

Surprisingly, it has been found that non-hydrogenated lipids in particular are effective to facilitate lignin depolymerization and thereby improve lignin liquefaction. By non-hydrogenated is meant the lipid has not been subjected to hydrogenation or partial hydrogenation.

The non-hydrogenated lipid can be combined with a hydrogen-donor solvent for use in a direct lignin liquefaction process. Any suitable amounts of lipid and hydrogen-donor solvent can be used. For example, the lipid may be included in an amount of from about 5% to about 95%, and the hydrogen-donor solvent may be included in an amount from about 5% to about 95%, by total weight of the lipid and hydrogen-donor solvent.

In certain embodiments, the non-hydrogenated lipid is pretreated to cyclize the oil or otherwise improve its use for hydrogen transfer to the lignin. Examples of such pretreatments include "bodying" to cyclize the oil, hydrothermal processing under supercritical conditions (e.g., a CH process by Advanced Research Associates), hydrothermal oxidation, or other ways of cyclizing. In certain embodiments, the non-hydrogenated lipid after pretreatment may be used by itself without a hydrogen donor solvent in a direct lignin liquefaction process.

In certain embodiments, the non-hydrogenated lipid is used in combination with one, two or more types of lignin solvent in a direct lignin liquefaction process. Some examples are lignin-derived solvents, converted hydrogen-donor biomass-derived lignin solvents, and lignin process recycle solvents. In a particular example, a non-hydrogenated soybean oil is used in combination with a coal tar distillate, an esterified organic acid, and a recycle stream from initial stage upgrading of coal syncrude.

Any suitable type of hydrogen-donor solvent may be used in combination with the non-hydrogenated lipid. Some common hydrogen donor solvents used in lignin liquefaction include indane, $C_{10}$ to $C_{12}$ tetralins, decalins, hydrogenated methylnaphthalene, hydrogenated dimethylnaphthalene, hydrogenated $C_{12}$ and $C_{13}$ acenaphthenes, tetrahydroquinolines, partially hydrogenated heterocyclic compounds and similar donor compounds. In certain embodiments, the hydrogen-donor solvent is a high hydrogen-donor biomass-derived lignin solvent according to the invention as described hereinabove. Select biomass-derived materials are used to dissolve, depolymerize, and hydrogenate lignin and coal.

Third, Optional, Hydrogen-Donor Solvent

In certain embodiments a non-biomass-derived hydrogen donor solvent may be added to the biomass-derived solvent blend in order to increase the amount of transferrable hydrogen. Examples of such hydrogen donors are hydrogenated coal tar distillate and cycle oil from petroleum refining.

Coal-Derived Solvents

As described above, optionally a coal-derived solvent is mixed with the biomass-derived solvents for use in the coal dissolution. The coal-derived solvent can help to slurry/depolymerize/solvate the coal.

Any suitable coal-derived solvent can be used in the process. For example, the coal-derived solvent may be a coal tar distillate (CTD). An example of a suitable coal tar distillate is a Koppers CTD. Such a solvent may be used as a start-up solvent and then at least partially replaced by recycling a portion of the process-derived syncrude.

As described above, a portion of the lignin liquefaction product from the present process (e.g., the "liquid produced after stage 1 hydrotreatment" as shown in FIGS. 2 and 3, or the lignin-derived liquids prior to hydrotreatment) can also be used as a lignin-derived solvent. This lignin liquefaction product, or syncrude, can be optimized for use as a solvent by removing the lighter fraction (e.g., materials having a boiling point less than about 200° C.) and using the middle and heavier fraction as the solvent.

In some embodiments, coal can be included with the lignin. The coal can be dissolved in a biomass-derived coal solvent, along with the lignin and biomass-derived lignin solvent. There will typically be more than 50% lignin, or more than 60%, or more than 70%, or more than 75%, or more than 80%, or more than 85%, or more than 90%, or more than 95%.

Lignin to Polyol

An alternative, non-fuel application for lignin is in the conversion to a specialty product such as polyols. Polyols are a component utilized in the production of products such as coatings, adhesives, sealants, and foams. Lignin has not been used in the preparation of polyols for a number of reasons. One issue is that the high molecular weight and limited cross-linking in lignin lead to poor compatibility with other chemicals. Even under high pressure hydrogen (>1000 psi) with catalyst only up to 60% lignin is converted to product with the balance typically being char. Another issue with lignin is that the chemical composition is different in different species of feedstock as well as from one season to another. One solution to improving the compatibility and activity of the lignin is to depolymerize it. By breaking the molecule into smaller structures, not only is the lignin more miscible with organics, but the functionality is increased, which improves the effectiveness of any functionalization such as alkoxylation.

An ideal application for functionalizing depolymerized lignin is the conversion to polyols, which can then be converted to rigid foams or other specialty products. Rigid foams typically involve the reaction product between a polyol and isocyanate. They typically get their rigidity through polyol cross-linking and the aromaticity of the isocyanate side. By using lignin for the polyol side, rigidity from the polyol can be obtained, allowing for the use of aliphatic isocyanates that are not usually used in rigid foam formulations. The claimed process was developed to overcome the low utilization of lignin.

Figure 4:
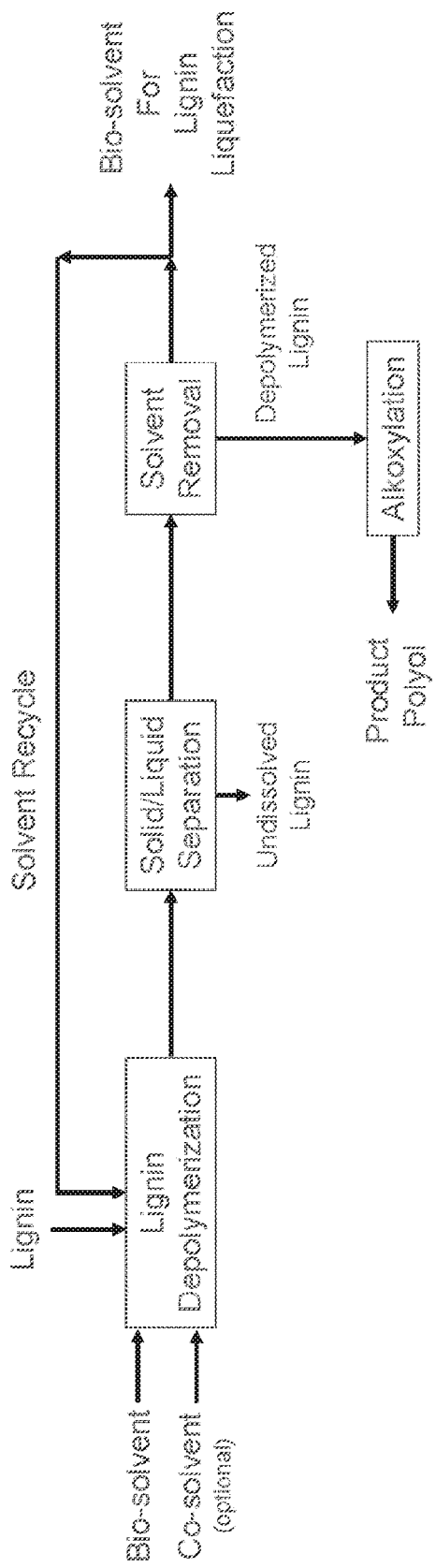
FIG. 4 is a flowchart of one embodiment of a lignin to polyol process.

One embodiment of a lignin depolymerization process can be found in FIG. 4. In this process, lignin is added to a reactor containing a bio-solvent, which also acts as a hydrogen donor, and heated to a temperature within the range of 250-450° C., preferably in the range of 275-420° C., for 10-90 minutes. A secondary co-solvent may also be used. The undissolved lignin and mineral material is then filtered out or centrifuged, and the depolymerized lignin is separated utilizing a solvent such as pentane. After separation, the depolymerized lignin can be functionalized through alkoxylation using a reactant such as ethylene or propylene oxide producing a liquid polyol. The polyol can then be used in the production of rigid foams or other products.

For example, 77.6 grams of Kraft lignin was reacted with 234.51 grams of bio-based solvent containing a hydrogen-donor solvent at 400° C. for 20 minutes. Once cooled, pentane was used to remove the bio-solvent from the depolymerized lignin. After separation, the depolymerized lignin was dried resulting in a yield of 90%. 35.06 grams of the depolymerized lignin was charged in a reactor containing 87.26 grams of propylene oxide and 3.24 grams of potassium hydroxide. The reactor was heated to 130° C. for 5 hours creating a final polyol product.

In another example of lignin depolymerization, 44.01 grams of Kraft lignin was reacted with 8.84 grams of hydrogen donor bio-based solvent in 122.72 grams of N-methyl-2-pyrrolidinone (NMP). The reaction was run at 300° ° C. for 30 minutes. The mixture was then filtered and rinsed with NMP. The solid was dried under vacuum and resulted in a yield of 90.5% depolymerized/soluble lignin. The depolymerized lignin was then purified from NMP.

Polyol Manufacture From Coal-Derived Syncrude

Figure 5:
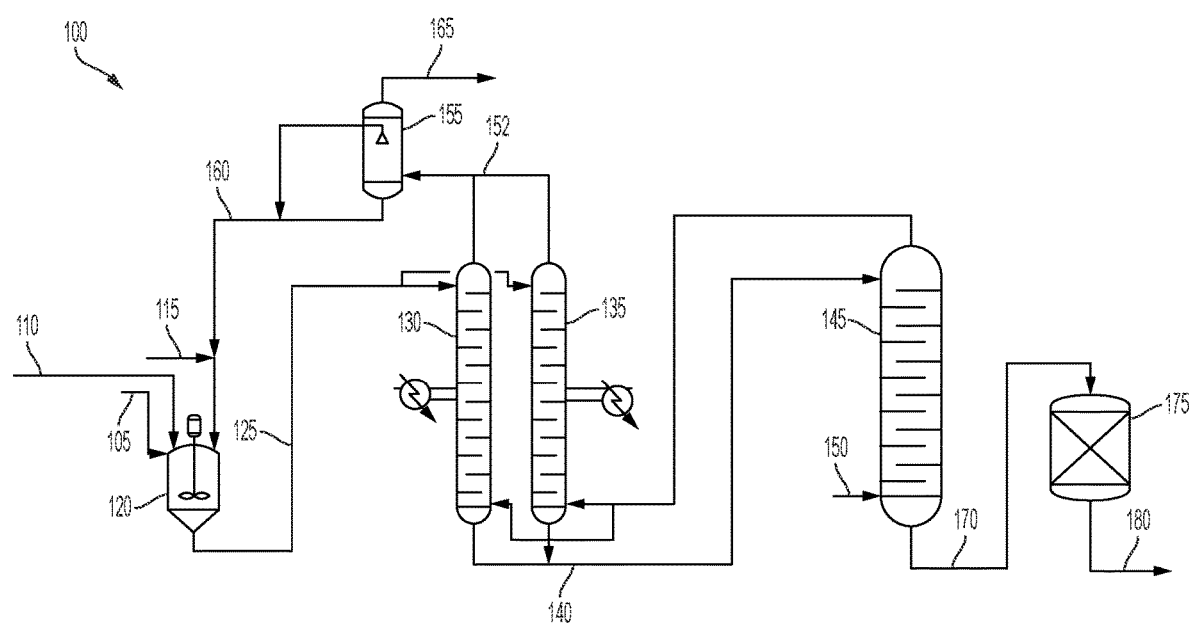
FIG. 5 is a flowchart of a portion of one embodiment of a process of converting a heavy oil mixture to polyol.

The process for conversion of the heavy-oil fraction from the syncrude to polyol is shown below in FIGS. 5 and 6 below. In the heavy-oil to polyol process 100, the coal-derived heavy oil 105, sulfuric acid 110, and hexanol 115 are mixed together in a feed tank 120. The mixture is heated by the feed heavy oil 105 (maintained at 150° in storage to retain flow) to about 100° C. in the feed tank 120.

The mixture 125 is pumped to from feed tank 120 to to ozonators 130, 135 in parallel. The liquid 140 is then pumped to a final ozonation vessel 145. These vessels 130/135 and 145 provide a two-stage ozonation process. The ozonation process is maintained at 2 atm and is maintained at 70° C. with cooling water.

The basis for the process design is 70 tonnes/day of heavy-oil feed 105. The feed 105 is assumed to be coming from the Coal to Liquids (CTL) facility at a hot temperature of 150° C. and sufficient pressure to flow into a mix tank 120. The heavy oil 105 will be mixed with hexanol 115 and 93% $H_2SO_4$ 110. The material balance is based on the following recipe:

The ozone requirement for the 70 tonne/day heavy-oil feed rate is 2938 lb/hr, or about 2100 cfm at 70° C. and 30 psig. Ozone is also the high cost reactant and needs to be converted efficiently. The reaction with ozone is exothermic and should be maintained at 70° C. The ozone is assumed to be provided 11.73% by weight ozone/remainder nitrogen, at 30 psig and 15.5° C. The ozone can be contacted with the heavy-oil mix by a few different methods. The basic method would be to inject the ozone in a series of stirred tanks. The heavy-oil mix would be cascaded through the mix tanks while the ozone is introduced at the bottom of each mix tank. This would assume that the ozone is absorbed into the mix in the liquid height of the tank. The heat would be removed by a cooling jacket or an external exchanger in a pump around loop.

Another method that could be investigated further is to use an educator to contact the ozone stream with the heavy-oil mix. This calls for a large heavy-oil flow (5000 gpm to 30,000 gpm) at high pressure (100 psig) to pull in the ozone required, and then a separation vessel to disengage the nitrogen and product oxygen from the heavy-oil mix.

The third method utilizes a countercurrent bubble tray column to contact the ozone with the heavy-oil mix. The ozone is assumed to be 25 psig flowing into the bottom of the 8 ft diameter high pressure column. This gas volume then be divided between two identical 6 ft diameter low pressure columns operating at 15 psig bottom pressure, where it would be contacted by the incoming heavy-oil mix. Each column is estimated to have 15 trays for contacting the ozone. Trays are spaced 18" apart and heavy-oil mix holdup is assumed to be sufficient for the reaction. The high-pressure column is assumed to have four pump arounds with cooling exchangers at tray 4,7,10, and 13. The low-pressure column is assumed to have pump arounds with cooling exchangers at tray 5 and 10. The heavy-oil mix from the low pressure columns would be combined and pass through another cooling exchanger before entering the high pressure column top tray. The cooling load is estimated to be about 15.9 MM btu/hr, based on previous ozone to polyol reaction energy balances. Cooling requirements may be mitigated by not heating the heavy-oil mix feed, although initial heating may be required to start the reaction. Vapor concentrations are at a reduced oxygen content and should be reviewed for flammability range. Solids build up in the column could present processing problems and should be evaluated.

Ozone 150 is provided from a toll ozonation process. The ozone is previously diluted with 50/50 with nitrogen. The oxygen and $N_2$ 152 are scrubbed after reaction to remove hexanol 160 in a spray tower 155. The gas mixture 165 is recycled to the ozone toll generator.

The reacted mix of ozonated heavy oil 170 is then neutralized by passing through a Dowex™ Marathon™ A resin bed 175. It is assumed that the resin will need to neutralize the full load of the $H_2SO_4$ in the solution. For an 8 hr bed online time, the resin bed volume required would be 460 ft3. Using an 8 ft diameter, 10 ft tall bed holds 502 $ft^3$ of resin. To allow for backwash, the bed straight side would be 16 ft. Allowing for three resin beds to cycle through the backwash, rinse, regeneration, and purge cycles, the total volume of resin required is 1506 $ft^3$. The oxidized heavy-oil mix in the resin bed would need to be pressed out with nitrogen. Hexanol would be used to backwash the resin bed and capture any esterified heavy oil remaining. This would then be drained to a hexanol recovery tank and recycled to the bio-solvent BS-41-hexanol mix tanks. Regeneration would be performed with 5% NaOH solution, and the wastewater would need to be treated.

Figure 6:
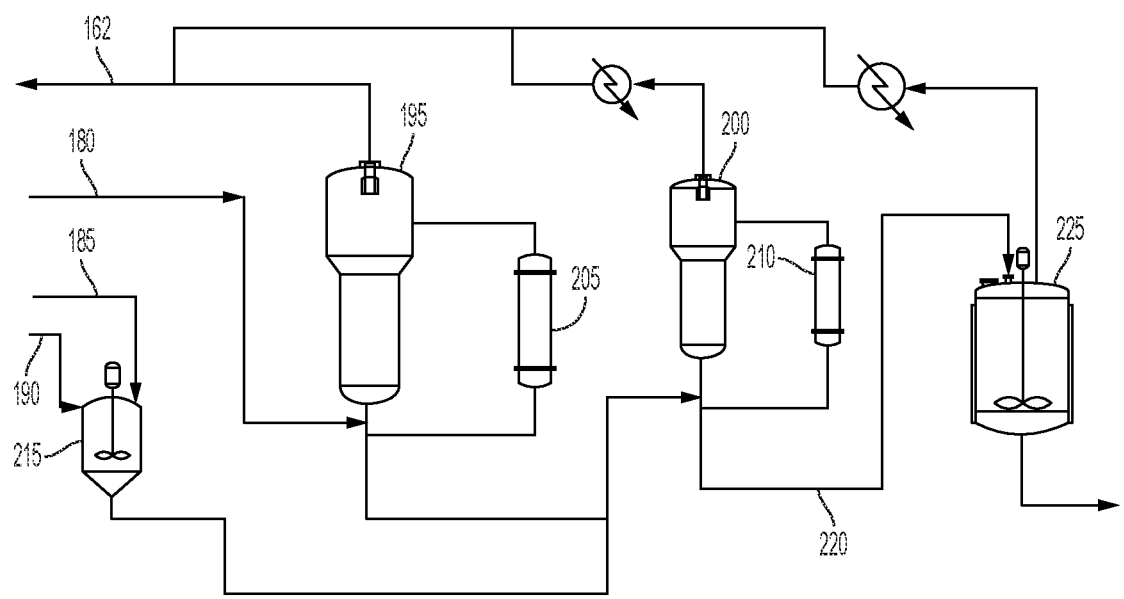
FIG. 6 is a flowchart of a second portion of the embodiment of the process of converting a heavy oil mixture to polyol of FIG. 5.

The mixture 180 is then sent to a multi-effect evaporator to remove recycle hexanol 162 as shown in FIG. 6.

The esterified and neutralized heavy oil 180 will be sent to a pair of flash evaporators 195, 200 to remove the remaining recycle hexanol 162. The first evaporator 195 duty is about 15.2 MM btu/hr while the second evaporator duty is 5.5 MM btu/hr. The reboilers 205, 210 are based on 20% vaporization through the tubes. This will reduce the volume of the transesterification tank 225, which requires a 2-hour residence time for conversion. FIG. 6 shows the glycerin-DO mixture from tank 215 being added to the output of the second evaporator 200.

Dibutyl tin oxide 190 and glycerin 185 are mixed in mix tank 215. Glycerine and dibutyltin oxide (DO) will be mixed in 4000 gal batch mix tanks 215. The mix tanks 215 will be sufficient for feeding the transesterification reactors 225 for 4 hrs per batch. This amounts to about a 55 gal drum of dibutyltin oxide per batch.

The dibutyl tin oxide and glycerin mixture and the heavy oil 220 are sent to transesterification reactors 225 for transexterification.

The final product (heavy-oil-derived polyol) is then pumped to tanks where it is stored and then shipped to a foam manufacturer.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process of producing syncrude from lignin comprising:
   preparing a biomass-derived lignin solvent comprising a hydrogen-donor solvent capable of dehydrogenating during lignin liquefaction and transferring a hydrogen atom to a lignin fragment;
   mixing the lignin with the biomass-derived lignin solvent to form a slurry;
   heating the slurry to dissolve the lignin by depolymerizing the lignin forming a lignin fragment, dehydrogenating the hydrogen-donor solvent and transferring the hydrogen atom to the lignin fragment in a transfer hydrogenation process to prevent re-polymerization of the lignin fragment and form a lignin-derived syncrude; and
   separating undissolved lignin and mineral matter from the lignin-derived syncrude;
   and wherein preparing the biomass-derived lignin solvent comprises preparing the hydrogen-donor solvent comprising at least one of:
     preparing the hydrogen-donor solvent by conjugating double bonds in linoleic acid, linoleic ester, or linoleic amide and cyclizing the conjugated double bonds to form the linoleic acid, linoleic ester, or linoleic amide with an appended cyclohexene ring;
     preparing the hydrogen-donor solvent by cyclizing an oleic acid, oleic ester, or oleic amide in a triglyceride to form the oleic acid, oleic ester, or oleic amide with an appended cyclohexene ring;
     preparing the hydrogen-donor solvent by reacting a double bond of two fatty acids, fatty esters, or fatty amides of a triglyceride to form a cyclohexene ring between the two fatty acids, fatty esters, or fatty amides;
     preparing the hydrogen-donor solvent by cyclizing fatty acids in soybean oil, a lipid from plants, or a fatty acid ester to form a modified soybean oil, lipid from plants, or fatty acid ester having a cyclohexene ring;
     processing pine trees to obtain phytosterols and rosin acids;
     preparing a modified hydrothermolysis oil by rapid hydrothermolysis of an oil to form a hydrothemolysis oil and modifying the hydrothermolysis oil to alter quantity and type of cyclics and aromatics; and
     preparing hydrogen-donor solvent having a tetrahydrofuran diol or ester by contacting an oil having an epoxidized fatty acid or epoxidized fatty acid ester with alumina or acid to form a modified oil having the tetrahydrofuran diol or ester.

2. The process of claim 1 which further comprises subjecting the lignin-derived syncrude to at least one of a hydrotreatment process and a hydrogenation process to produce a distillate fuel.

3. The process of claim 1 wherein the lignin is dissolved without using molecular hydrogen and an added hydroliquefaction catalyst.

4. The process of claim 1 wherein an H/C atomic ratio of the syncrude is at least 5% more than that of the lignin.

5. The process of claim 1 wherein an H/C atomic ratio of the syncrude is at least 20% more than that of the lignin.

6. The process of claim 1 wherein the biomass-derived solvent additionally comprises a second solvent that helps to slurry the lignin and/or depolymerize the lignin and/or solvate the lignin.

7. The process of claim 6 wherein the second solvent is a polyunsaturated bio-based oil.

8. The process of any claim 1 further comprising:
   mixing a coal-derived solvent with the biomass-derived lignin solvent to form a solvent mixture; and
   wherein dissolving the lignin in the biomass-derived lignin solvent comprises dissolving the lignin and coal in the solvent mixture.

9. The process of claim 8 wherein the coal-derived solvent comprises a coal tar distillate or a portion of the syncrude produced in the process.

10. The process of claim 8 wherein the coal-derived solvent includes a portion of partially hydrotreated coal-derived syncrude.

11. The process of claim 1 wherein the hydrogen-donor solvent has a cyclic ring with one or more double bonds on the ring without being fully aromatized.

12. The process of claim 1 further comprising:
    providing a biomass-derived coal solvent;
    dissolving coal with the lignin in the biomass-derived lignin solvent and the biomass-derived coal solvent.

13. The process of claim 1 wherein preparing the hydrogen-donor solvent comprises conjugating double bonds in linoleic acid, linoleic ester, or linoleic amide and cyclizing the conjugated bonds to form the linoleic acid, linoleic ester, or linoleic amide with the appended cyclohexene ring.

14. The process of claim 1 wherein preparing the hydrogen-donor solvent comprises cyclizing the oleic acid, oleic ester, or oleic amide to form the hydrogen-donor solvent having the oleic acid, oleic ester, or oleic amide with the appended cyclohexene ring.

15. The process of claim 1 wherein preparing the hydrogen-donor solvent comprises reacting the double bond of two fatty acids, fatty esters, or fatty amides of the triglyceride to form the cyclohexene ring between the two fatty acids, fatty esters, or fatty amides.

16. The process of claim 1 wherein preparing the hydrogen-donor solvent comprises cyclizing fatty acids in soybean oil, the lipid from plants, or the fatty acid ester to form the modified soybean oil, lipid from plants, or fatty acid ester having a cyclohexene ring.

17. The process of claim 1 wherein preparing the hydrogen-donor solvent comprises processing pine trees to obtain phytosterols and rosin acids.

18. The process of claim 1 wherein preparing the hydrogen-donor solvent comprises preparing the modified hydrothermolysis oil by rapid hydrothermolysis of the oil to form the hydrothemolysis oil and modifying the hydrothermolysis oil to alter quantity and type of cyclics and aromatics.

19. The process of claim 1 wherein preparing the hydrogen-donor solvent comprises preparing the hydrogen-donor solvent having a tetrahydrofuran diol or ester by contacting the oil having an epoxidized fatty acid or epoxidized fatty acid ester with alumina or acid to form the modified oil having the tetrahydrofuran diol or ester.

20. A process of producing syncrude from lignin comprising:
    preparing a biomass-derived lignin solvent comprising a hydrogen-donor solvent;
    dissolving the lignin in the biomass-derived lignin solvent to form lignin-derived syncrude; and
    separating undissolved lignin and mineral matter from the lignin-derived syncrude;
    wherein the hydrogen-donor solvent is prepared by appending cyclohexene groups in linoleic acids to produce a modified oil.

21. A process of producing syncrude from lignin comprising:
- preparing a biomass-derived lignin solvent comprising a hydrogen-donor solvent;
- dissolving the lignin in the biomass-derived lignin solvent to form lignin-derived syncrude; and
- separating undissolved lignin and mineral matter from the lignin-derived syncrude;
- wherein the hydrogen-donor solvent is prepared by appending cyclohexene groups in oleic acids to produce a modified oil.

* * * * *